May 1, 1934.  C. A. SABBAH ET AL  1,957,230
ELECTRIC VALVE CONVERTING SYSTEM
Filed Aug. 2, 1933
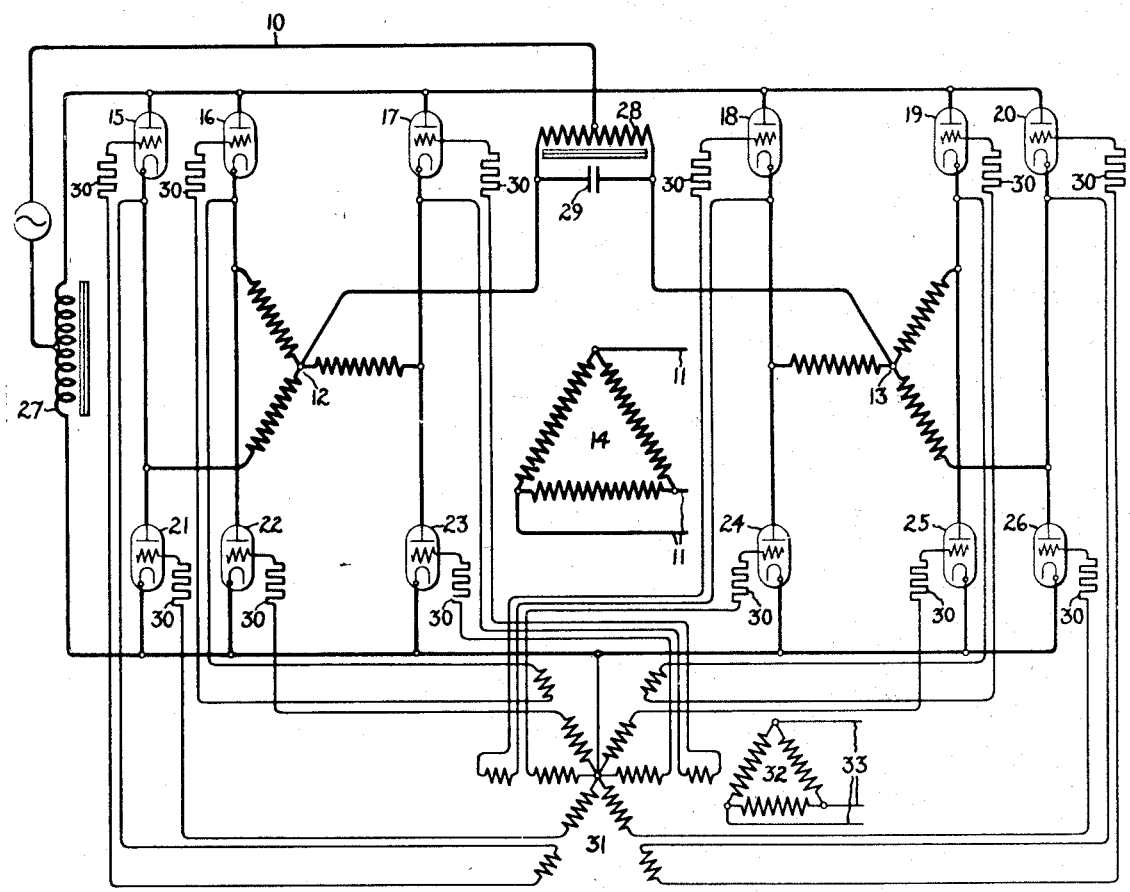
Inventors:
Camil A. Sabbah,
Albert H. Mittag,
by Harry E. Dunham
Their Attorney.

Patented May 1, 1934

1,957,230

UNITED STATES PATENT OFFICE 1,957,230

ELECTRIC VALVE CONVERTING SYSTEM

Camil A. Sabbah and Albert H. Mittag, Schenectady, N. Y., assignors to General Electric Company, a corporation of New York Application August 2, 1933, Serial No. 683,338

4 Claims. (Cl. 172—281)

Our invention relates to electric valve converting systems, and more particularly to such systems suitable for transmitting energy from a single phase alternating current supply circuit to a polyphase alternating current motor or a polyphase alternating current load circuit of a frequency either higher or lower than that of the supply circuit.

Heretofore there have been devised numerous electric valve converting systems for transmitting energy between direct and alternating current circuits, independent alternating current circuits of the same or different frequencies or direct current circuits of different voltages. The use of valves of the vapor or gaseous electric discharge type has been found to be particularly advantageous in such converting systems because of the relatively large amounts of power which may be handled at ordinary operating voltages. On the other hand, the use of such gaseous or vapor electric discharge valves has rendered certain of the arrangements of the prior art complex and has required the addition of auxiliary equipment of considerable kv-a. rating.

It is an object of our invention to provide an improved electric valve converting system for transmitting energy from a single phase alternating current supply circuit to a polyphase alternating current load circuit which will be simple, reliable, and economical in operation.

It is a further object of our invention to provide a new and improved electric valve converting system for transmitting energy from a single phase alternating current supply circuit to a polyphase alternating current load circuit which will require apparatus having a minimum kv-a. rating.

In accordance with one embodiment of our invention, a polyphase alternating current motor or a polyphase alternating current load circuit comprising a pair of inductive networks is connected to be supplied from a single phase alternating current circuit. The several phase terminals of the inductive networks are connected to one side of the supply circuit through two groups of oppositely connected electric valves and a reactance device provided with an electrical midpoint which forms the connection to the supply circuit. The other side of the supply circuit is connected to the electrical neutrals of the network and this connection includes means for producing an electromotive force which is a harmonic of that of the load circuit for commutating the current between the several electric valves. This commutating means may take the form of a commutating transformer and capacitor of a type well known in the art.

For a better understanding of our invention, together with other and further objects thereof, reference is had to the following description taken in connection with the accompanying drawing and its scope will be pointed out in the appended claims. The single figure of the drawing illustrates an electric valve converting system embodying our invention for transmitting energy from a single phase alternating current supply circuit to a three phase alternating current load circuit.

Referring now more particularly to the single figure of the drawing there is illustrated an electric valve converting system for transmitting energy from a single phase alternating current supply circuit 10 to a three-phase alternating current load circuit 11. This system includes a three-phase transformer apparatus comprising a pair of Y-connected primary winding networks 12 and 13 and a secondary winding network 14 connected to the load circuit 11, although the networks 12 and 13 may comprise the armature windings of a motor in case the load is a single motor. The several phase terminals of the networks 12 and 13 are connected to one side of the supply circuit 10 through a group of electric valves 15–20, inc., and also through a group of oppositely disposed electric valves 21–26, inc. These two groups of valves are interconnected through a reactance device 27 provided with an electrical midpoint which furnishes a point of connection to the supply circuit 10. Each of the several electric valves 15–26, inc., is provided with an anode, a cathode and a control grid, and may be of any of the several types well known in the art, although we prefer to use valves of the gaseous or vapor electric discharge type. The electrical neutrals of the networks 12 and 13 are connected to the other side of the supply circuit 10 through opposite halves of a commutating transformer winding 28, across which is connected a commutating capacitor 29.

In order to render the several electric valves conductive in the proper sequence, their grids are connected to their respective cathodes through current limiting resistors 30 and appropriate phase windings of the secondary network 31 of a grid transformer, the primary network 32 of which is connected to a three-phase alternating current circuit 33 of a frequency which it is desired to supply the load circuit 11. However, it will be obvious that, in case the alternating current circuit 11 is connected to an independent source of electromotive force for determining its frequency, the primary winding 32 of the grid transformer may be connected directly thereto. It will also be understood that, in case valves of the vapor electric discharge type are utilized, the positive portions of the potential waves impressed upon the grid of each of the several electric valves should be of a duration of less than 180° or of peaked wave form, as for example, by designing the transformer comprising the networks 31 and 32 to be self-saturating or by interposing self-saturating transformers between network 31 and the grids of the several electric valves, as disclosed and claimed in a copending application of B. D. Bedford, Serial No. 485,335, filed September 29, 1930, and assigned to the same assignee as the present application.

In explaining the operation of the above-described apparatus, it will be assumed that the frequency of the alternating current load circuit 11 is higher than that of the supply circuit 10 and that the upper terminal of the supply circuit 10 is at the particular instant positive. It will also be assumed that the commutating transformer 28 is an auto-transformer of conventional design with negligible leakage reactance and that electric valve 21 is initially conducting current. Under these conditions, current will flow from the upper terminal of the supply circuit 10 through the left-hand portion of the commutating transformer 28, the lower phase winding of the network 12, electric valve 21 and the lower portion of the reactance device 27 to the other side of the supply circuit. The current flowing in the left-hand portion of the commutating transformer 28 must be balanced by an equal and opposite current flowing in its right-hand portion and the only path for this current comprises the commutating capacitor 29, with the result that during the interval in which the valve 21 is conducting the capacitor 29 becomes charged to a potential dependent upon the magnitude of the load current. Substantially 60 electrical degrees later, electric valve 24 is rendered conductive and the potential across the commutating capacitor 29 is effective to transfer the current from electric valve 21 to electric valve 24, even though such commutation takes place at a point in the cycle of alternating potential of the circuit 11 at which the electromotive force of the phase windings of the networks 12 and 13 interconnecting these valves opposes such commutation. In this manner the current is successively transferred between the several phases of the networks 12 and 13 at a frequency dependent upon that of the alternating current control circuit 33. The polarity of the secondary windings of the grid network 31 are such that one of the valves of the group 15–20, inc., and one of the valves of the group 21–26, inc., that is, one "positive" and one "negative" valve, are simultaneously rendered conductive, these valves being associated with phases of the networks 12 and 13 of opposite phase; for example, electric valves 21 and 19, 24 and 17, etc., are simultaneously rendered conductive. If the alternating current supply circuit 10 reverses polarity, for example, during the conductive period of the electric valve 24, when electric valves 16 and 26 are rendered conductive the polarity of the supply potential will be such that current will flow from the lower terminal of the supply circuit 10 through the upper portion of the reactance device 27, electric valve 16, the left-hand portion of the commutating transformer 28 to the other side of the supply circuit. During this half cycle of supply current the commutating capacitor 29 will be effective to transfer the current between the positive valves 15–20, inc., in the same manner that it commutates the current between the negative valves 21–26, inc., during alternate half cycles of the supply current. The reactance device 27 tends to maintain the supply current constant and also serves to minimize any short circuit current in case of a failure of one or more of the electric valves.

In the explanation given above, it has been assumed that the commutating transformer 28 had a negligible leakage reactance so that each of the electric valves was conductive for substantially 60 electrical degrees. By designing the transformer 28 with an appreciable leakage reactance, however, the transfer of current between the valves associated with the network 12 and the valves associated with the network 13 may be retarded over an interval approaching 60 electrical degrees as a limit. Under these conditions, each of the several electric valves is conductive for substantially 120 electrical degrees, the valves associated with the network 12 becoming conductive in staggered relation with respect to the valves associated with the network 13 and their conductive periods overlapping by approximately 60 electrical degrees.

In case the supply circuit 10 is of a higher frequency than the load circuit 11, the operation will be substantially similar to that described above with the exception that a transfer of current between the positive valves 15–20, inc., and the negative valves 21–26, inc., will occur one or more times within each cycle of the low frequency alternating current; that is, one or more times within the conductive period of each pair of electric valves simultaneously rendered conductive. The transfer of current between the electric valves associated with the network 12 and those associated with the network 13 at the frequency of the load circuit will be effected in a similar manner. Under these conditions, it is necessary that the positive grid excitation for each electric valve shall have a duration substantially equal to its conductive period.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is,—

1. An electric valve frequency changing system comprising a single phase alternating current supply circuit, a polyphase alternating current load circuit including a pair of polyphase inductive networks each provided with an electrical neutral, a pair of oppositely connected groups of electric valves interconnecting the several phase terminals of said networks with one side of said supply circuit, means for controlling the conductivity of said valves, a connection from the other side of said supply circuit to said neutrals, and means included in said connection for producing an electromotive force to commutate the current between said valves.

2. An electric valve frequency changing system comprising a single phase alternating current supply circuit, a polyphase alternating current load circuit including a pair of polyphase inductive networks each provided with an electrical neutral, a group of electric valves connected to the several phase terminals of said networks, a second group of oppositely disposed electric valves connected to said phase terminals, a reactance device interconnecting said groups of valves and provided with an intermediate terminal connected to one side of said supply circuit, means for controlling the conductivity of said valves, a connection from the other side of said supply circuit to said neutrals, and means included in said connection for producing an electromotive force to commutate the current between said valves.

3. An electric valve frequency changing system comprising a single phase alternating current supply circuit, a polyphase alternating current load circuit including a pair of polyphase inductive networks each provided with an electrical neutral, a pair of oppositely connected groups of electric valves interconnecting the several phase terminals of said networks with one side of said supply circuit, means for controlling the conductivity of said valves, a commutating transformer interconnecting said neutrals and provided with an electrical midpoint connected to the other side of said supply circuit, and means for producing in said transformer an alternating potential which is a harmonic of that of said load circuit to commutate the current between said valves.

4. An electric valve frequency changing system comprising a single phase alternating current supply circuit, a polyphase alternating current load circuit including a pair of polyphase inductive networks each provided with an electrical neutral, a group of electric valves connected to the several phase terminals of said networks, a second group of oppositely disposed electric valves connected to said phase terminals, a reactance device interconnecting said groups of valves and provided with an electrical midpoint connected to one side of said supply circuit, means for rendering said valves conductive in a predetermined sequence, a commutating transformer interconnecting said neutrals and provided with an electrical midpoint connected to the other side of said supply circuit, and a commutating capacitor connected across said tranformer.

CAMIL A. SABBAH.
ALBERT H. MITTAG.